(12) United States Patent
Brugger et al.

(10) Patent No.: US 7,367,255 B2
(45) Date of Patent: May 6, 2008

(54) DEVICE AND METHOD FOR SEPARATING AT LEAST ONE OPTICAL FIBER

(75) Inventors: Rudolf Brugger, Puchheim (DE); Jürgen Islinger, Dürnhausen (DE)

(73) Assignee: Siemens Aktiengesellschaft, Munich (DE)

( * ) Notice: Subject to any disclaimer, the term of this patent is extended or adjusted under 35 U.S.C. 154(b) by 503 days.

(21) Appl. No.: 10/485,309

(22) PCT Filed: Jun. 14, 2002

(86) PCT No.: PCT/DE02/02186

§ 371 (c)(1),
(2), (4) Date: Jan. 30, 2004

(87) PCT Pub. No.: WO03/012502

PCT Pub. Date: Feb. 13, 2003

(65) Prior Publication Data

US 2004/0232189 A1 Nov. 25, 2004

(30) Foreign Application Priority Data

Jul. 30, 2001 (DE) .................................. 101 37 227

(51) Int. Cl.
*B26D 3/08* (2006.01)
(52) U.S. Cl. ............................................. 83/879; 225/2
(58) Field of Classification Search .................. 30/341; 83/410.7, 411.1, 879, 411.3, 411.4; 29/869; 225/2

See application file for complete search history.

(56) References Cited

U.S. PATENT DOCUMENTS 4,463,886 A   8/1984  Thornton
4,473,942 A * 10/1984  Ridgway ..................... 29/869
5,123,581 A *  6/1992  Curtis et al. ................... 225/2
6,122,936 A    9/2000  Csipkes et al.

FOREIGN PATENT DOCUMENTS

| DE | 2919121 | 11/1979 |
|---|---|---|
| DE | 3317304 | 12/1983 |
| DE | 3322127 | 12/1984 |
| DE | 4314357 | 11/1994 |
| DE | 69112117 | 1/1996 |
| EP | 0528636 | 2/1993 |
| WO | WO 99/47954 | 9/1999 |
| WO | WO 00/45205 | 8/2000 |

OTHER PUBLICATIONS

Williams T: "Java goes to work controlling networked embedded systems", XP 000631206.
Geldammer G: HTML-script calls Java-applet . . . a new development technique under a software- and applications- technology configuration XP002103581.

* cited by examiner

*Primary Examiner*—Kenneth E. Peterson
*Assistant Examiner*—Sean Michalski
(74) *Attorney, Agent, or Firm*—Harness, Dickey & Pierce, PLC

(57) ABSTRACT

A device and method are for separating at least one optical fiber. A swivelled element and an asymmetric anvil are used so that a section of the fiber is contacted only in two positions that are substantially insignificant for the tensile strength of a spliced fiber. In one position, the glass fiber core of the section of the fiber is protected from damages by a fiber sheathing. In the other position that is contiguous to the position of separation, mechanical damages are of minor importance since they are at least partially repaired by the heat produced during splicing.

32 Claims, 4 Drawing Sheets

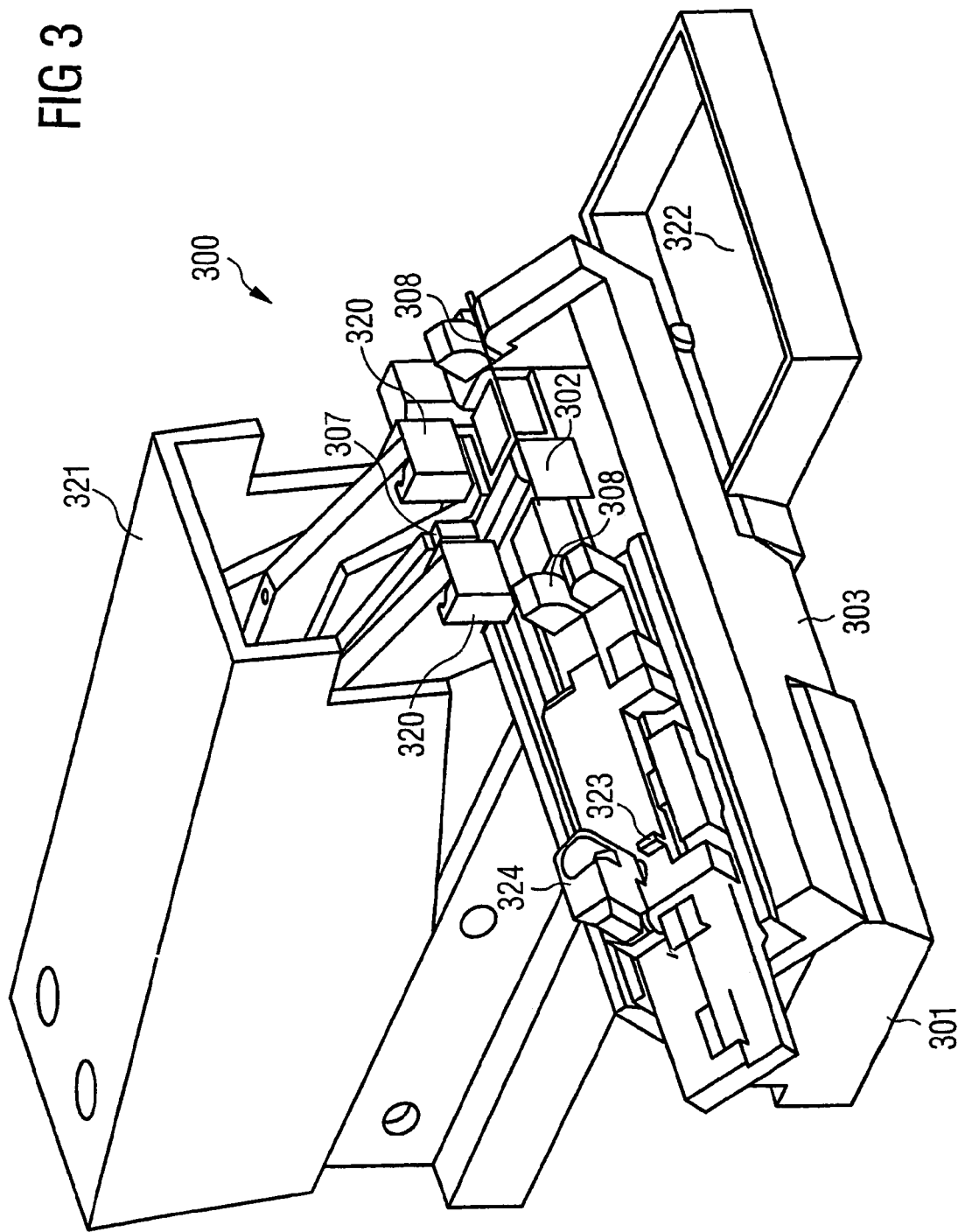

DEVICE AND METHOD FOR SEPARATING AT LEAST ONE OPTICAL FIBER

This application is the national phase under 35 U.S.C. § 371 of PCT International Application No. PCT/DE02/02186 which has an International filing date of Jun. 14, 2002, which designated the United States of America and which claims priority on German Patent Application number DE 101 37 227.2 filed Jul. 30, 2001, the entire contents of which are hereby incorporated herein by reference.

FIELD OF THE INVENTION

The invention generally relates to an apparatus for separating at least one optical fiber. Preferably, it relates to one in which mechanically sensitive areas of the fiber to be separated or cut can be moved into the separating or cutting apparatus essentially without any contact.

BACKGROUND OF THE INVENTION

In the age of modern communication and information technology, optical data transmission by way of glass fiber cables plays a critical role. The design of reliable optical networks is dependent on the capability to cut glass fiber cables, which are also referred to in the following text as optical fibers or optical waveguides, such that a defined end surface, in particular an end surface which is as planar as possible, is produced at the end of the cut glass fiber cables. Planar end surfaces are required, for example, for splicing, that is to say thermal connection of two glass fiber cables to form a new, longer glass fiber cable, when the spliced joint is intended to result in the optical losses being as low as possible. Planar end surfaces are likewise required for low-loss optical coupling between an optical fiber and an optical connector or an optical coupling.

Optical fibers are generally cut by positioning the glass fiber at the point to be cut parallel over an anvil in an apparatus for cutting optical fibers, and by scoring it at right angles to the glass fiber. This can be done by using a scoring apparatus. When the optical fiber is subsequently bent, it preferably breaks at the scoring point. High-quality cutting apparatuses for glass fibers are in consequence distinguished in that the broken surface, which runs at right angles to the glass fiber axis, is as planar as possible, and in that the broken surface quality is subject to as few fluctuations as possible over a large number of cutting processes.

DE 33 17 304 A1 discloses an apparatus for cutting optical waveguides, which allows a high broken surface quality to be achieved, that is to say the broken surfaces of cut glass fibers are essentially free of disturbing notches, scratches and other uneven features. The high broken surface quality is achieved by providing a slot in an anvil, thus producing a symmetrical stress distribution in the cross section of the glass fiber at the scoring point. In this case, the width of the slot is governed by the diameter of the fiber to be cut.

DE 33 22 127 A1 discloses a method and an apparatus for cutting optical waveguides, in which the optical waveguide to be cut is held firmly with the aid of two clamping devices, is prestressed over an anvil in the axial direction with the aid of a tensioning device, and is scored transversely axially at the cutting point on the anvil with the aid of a scoring device. Manual intervention during the operation of the cutting apparatus is largely precluded, in order to ensure that the quality of the broken surfaces that are produced during the cutting process is uniformly high. This is achieved by way of a common operating element, by which the scoring device, the clamping devices and the tensioning device are each moved against a spring force to a position such that the clamping devices, tensioning device and the scoring device are operated autonomously and successively after the insertion of the optical waveguide to be cut and when the load on the operating element is removed.

Furthermore, WO 99/47954 discloses a cutting apparatus for optical fibers, which has a control device, which can be operated manually, as well as functional elements for successive clamping, scoring and breaking of the fibers. All the functional elements are operated by way of the control device. Transmission elements and spring elements are provided between the, control device and the functional elements, and allow the functional elements to be moved in a defined sequence as a function of the forward and return movement of the control device.

EP 0 528 636 A1 discloses an apparatus both for cutting and for splicing optical waveguides, in which, after a cutting process, the optical waveguides to be spliced can be transferred by means of a transfer apparatus, which can pivot, from the cutting apparatus in the correct orientation to the splicing apparatus.

U.S. Pat. No. 4,463,886, DE 29 19 121 and U.S. Pat. No. 6,122,936 each disclose cutting apparatuses for optical waveguides, in which the optical waveguides are slightly curved before the scoring process. As a result of the mechanical stress which is caused in the optical waveguide by the bending process, the optical waveguide is broken by the scoring process, resulting in a largely planar optical waveguide end surface.

The known cutting apparatuses for optical fibers have the disadvantage that the fiber is inserted into the cutting apparatus manually, so that there is a risk of the cylindrical outer surface of the cylindrical fiber being mechanically damaged, particularly in the vicinity of the cutting point. This thus considerably reduces the tensile strength of the spliced glass fibers.

SUMMARY OF THE INVENTION

An embodiment of the invention is therefore based on an object of providing an apparatus and a method for cutting at least one optical fiber. As such, the risk of mechanical damage to the optical fiber to be cut, particularly in the vicinity of the cutting point, is reduced.

An object may be achieved by an apparatus for cutting at least one optical fiber. The apparatus according to an embodiment of the invention accordingly has a contact element and an element which can pivot, is mounted on a rotation shaft such that it can pivot relative to the contact element, and can pivot between an insertion position and a cutting position. A holding apparatus with an interruption is fitted to or formed on the element which can pivot, so that a single fiber can be held in a defined position on the element which can pivot. A scoring device is fitted to the contact element such that a fiber which is held by the holding apparatus can be scored at right angles to its longitudinal direction in the area of the interruption when the element which can pivot is in the cutting position.

When the fiber is being scored, a sharp-edged element of the scoring device is moved on a scoring plane which runs parallel to the longitudinal axis of the fiber to be cut. The apparatus according to an embodiment of the invention is furthermore distinguished in that the rotation shaft is arranged in the contact element such that a fiber which is held by the holding apparatus is touched by the contact element exclusively in the cutting position when the element which can pivot is being pivoted from the insertion position to the cutting position. When the element which can pivot is located in the insertion position, the holding apparatus is at a distance from the other components of the apparatus, such that the holding apparatus is freely accessible from one side for convenient and protective insertion of a fiber to be cut.

A first clamping apparatus and a second clamping apparatus are fitted to the contact element and/or to the element which can pivot, with the first clamping apparatus fixing each fiber which is held by the holding apparatus, on a first side of the interruption and the second clamping apparatus fixing each fiber which is held by the holding apparatus, on the second side of the interruption. This ensures that the fiber to be cut is held in a defined manner, in a simple and advantageous way.

The contact element has a curved surface along the longitudinal direction of the fiber so that a fiber that needs to be cut is prestressed with a defined curvature if the element which can pivot is in the cutting position. Prestressing the fiber to be cut has the advantage that the resultant broken surface quality of the fiber ends is considerably improved.

The contact element is designed asymmetrically relative to the interruption and along the longitudinal direction of the fiber such that a subsection of the fiber which is to be cut, has no sheath and is located on the first side of the interruption is held essentially without any contact while the element which can pivot is in the cutting position, and touches the contact element only in the at least immediate vicinity of the interruption. This has the advantage that the part of the optical fiber to be cut and which is used for a subsequent splicing process or for optical coupling to an optical connector or to an optical coupling, is touched by the contact element only in the immediate vicinity of the cutting point. This results in deformed points being produced only in the immediate vicinity of the cutting point, and these have scarcely any influence on the tensile strength of the fiber since these deformed points are largely healed thermally during a subsequent splicing process.

The contact element has a plastic insert. This is arranged such that that subsection of the fiber to be cut which has no sheath is touched exclusively by the plastic insert and not by the contact element. The use of a plastic insert such as this has the advantage that the mechanical damage in the vicinity of the cutting point is considerably reduced, so that the resultant tensile strength of a spliced fiber is considerably increased.

The contact element has an anvil and a base element. This configuration in at least two parts has the advantage that only the relatively small anvil need be manufactured with high precision from a high-quality material, rather than the entire base element, in order that the fiber to be cut can be placed on the anvil during the scoring process such that it is protected as well as possible and is in a precisely defined physical position.

One particularly preferred development of an embodiment of the invention is distinguished in that the contact element has contact points which are at different distances from the scoring plane, and in that the rotation shaft of the element which can pivot can be moved. The fiber to be cut rests on the contact point which is associated with the respective position, as a function of the respective position of the rotation shaft, when the element which can pivot is in the cutting position. This has the advantage that fibers of different thickness can be cut using one and the same cutting apparatus.

According to an embodiment, the vertical distance between the center axis of the fiber to be cut and the scoring plane remains unchanged when the rotation shaft is moved. This has the advantage that the vertical position of the fiber core relative to the scoring device remains unchanged for fiber sheaths of different thickness, provided that the rotation shaft of the element which can pivot is moved to a position which is associated in a corresponding manner with the thickness of the fiber sheath. With the diameter of the fiber core remaining unchanged, it is thus possible to cut fibers with sheaths of different thickness without having to be concerned about the overall diameter of the fiber, with a constant accuracy and without any special adjustment of the scoring device.

According to another development, the rotation shaft can be moved between at least two discrete positions such that, particularly when using an eccentric lever, the cutting apparatus can be switched in a simple manner to allow fibers of different thickness to be cut.

An object relating to a method on which an embodiment of the invention is based is achieved by a method for cutting at least one optical fiber. In the method according to an embodiment of the invention, an element which can pivot is first of all moved to an insertion position, before the fiber to be cut is passed to a holding apparatus which is fitted to or formed on the element which can pivot, by which the fiber is held in a defined position relative to the element which can pivot, over the entire profile of a pivoting movement. After this, the element which can pivot is pivoted from the insertion position to a cutting position, with the fiber being held essentially parallel to the rotation axis of the pivoting movement, and the fiber being touched by a contact element exclusively in the cutting position. After pivoting to the cutting position, the fiber is scored at a predetermined cutting point by way of a scoring device which is fitted to the contact element, so that the fiber to be cut is cut into two parts. The scoring movement is in this case at right angles to the longitudinal, direction of the fiber, in a scoring plane which is arranged parallel to the longitudinal direction of the fiber. The element which can pivot is then pivoted from the cutting position to a removal position, and the fiber is removed from the holding apparatus.

In another embodiment, before the fiber to be cut is scored, the fiber is additionally fixed by way of a first clamping apparatus and a second clamping apparatus on the element which can pivot. After the element which can pivot has pivoted from the cutting position to the removal position, fixing of the fiber by the first clamping apparatus and the second clamping apparatus is released, with the first clamping apparatus fixing the fiber of a first side of the predetermined cutting point, and the second clamping apparatus fixing the fiber on the second side of the predetermined cutting point. This has the advantage that it prevents any movement, caused by the movement of the scoring blade, of the optical fiber to be cut, during the scoring process, thus satisfying an important precondition for the fiber end surfaces to have a uniform high quality.

According to one particularly preferred development of an embodiment of the invention, the cutting apparatus is matched to different fiber diameters in that, before the element which can pivot is pivoted from the insertion position to the cutting position, the rotation shaft is moved such that the fiber to be cut touches the contact element at a contact point which is associated with the respective position of the rotation shaft, after the element which can pivot has been pivoted to the cutting position, with the distance between the scoring device and the respective contact point depending on the position of the contact element.

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein:

FIG. 3 shows a perspective overall view of the cutting apparatus according to the first exemplary embodiment of the invention.

DETAILED DESCRIPTION OF THE PREFERRED EMBODIMENTS

Figure 1A:
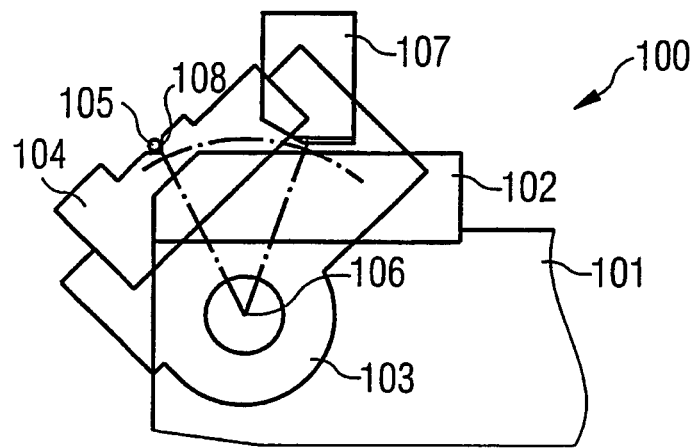
FIG. 1a shows a schematic cross-sectional view at rights angles to the axis of the fiber to be cut of a cutting apparatus according to a first exemplary embodiment of the invention. The element which can pivot is in the insertion position.
Figure 1B:
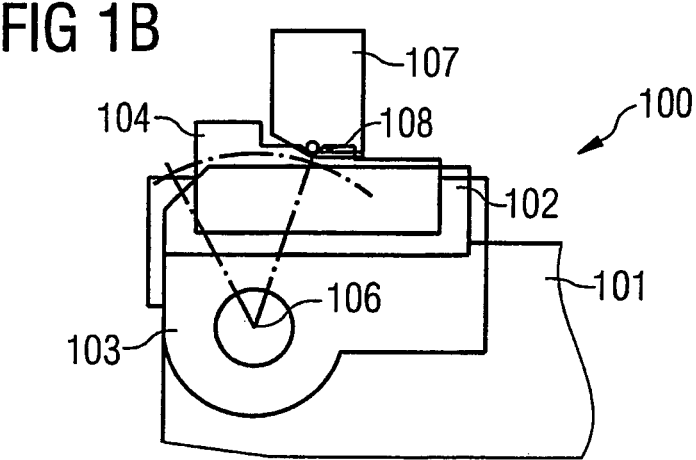
FIG. 1b shows the cutting apparatus as illustrated in FIG. 1a. The element which can pivot is in the cutting position.

FIGS. 1a and 1b show schematic cross-sectional views at right angles to the axis of the optical fiber to be cut of a cutting apparatus 100 according to a first exemplary embodiment of the invention. Where the same reference symbols are used in the following text and in FIGS. 1a and 1b, then they always relate to the same components of the cutting apparatus 100.

The cutting apparatus 100 has a so-called contact element which in turn, on the basis of the exemplary embodiment described here, has a base plate 101 and an anvil 102. As will be explained in more detail in the following text, it is worthwhile splitting the contact element into the base plate 101 and the anvil 102 because an optical fiber 105 to be cut makes contact only with the anvil 102 in the course of the cutting process. In consequence, only the anvil 102 need satisfy the stringent requirements for a precise shape and surface characteristic, which are necessary in order to prevent unnecessary damage to the optical fiber 105 to be cut. An element 103 which can pivot is mounted on a rotation shaft 106, such that it can pivot, on the base plate 101, with the rotation shaft 106 being arranged in a fixed position relative to the base plate 101.

The element 103 which can pivot has a cutout in which a fiber holder 104 is accommodated. A groove 108 with a triangular cross section is formed on the fiber holder 104, and is suitable for accommodating the optical fiber 105 to be cut. At this point, it should be mentioned that the groove 108 may, of course, have a likewise differently shaped cross-sectional area, or may have any desired different cross-sectional areas along its longitudinal direction. The cutting apparatus 100 also has a scoring device, which is attached to the base plate 101. Only a so-called scoring blade 107 of the scoring device is illustrated in FIGS. 1a and 1b, whose lower edge is designed such that the cylindrical surface of the fiber 105 to be cut can be scored. The element 103 which can pivot is mounted such that it can pivot in such a way that it can be pivoted between a so-called insertion position (see FIG. 1a) and a cutting position (see FIG. 1b).

The method of operation of the cutting apparatus 100 will be described in more detail in the following text. In order to cut an optical fiber according to the exemplary embodiment of the invention as described here, the element 103 which can pivot is first of all pivoted to the insertion position (see FIG. 1a). The optical fiber 105 to be cut is then inserted into the groove 108 that is formed on the fiber holder 104, and is fixed in the groove 108 by means of two clamping apparatuses (not illustrated).

The element 103 which can pivot is then pivoted from the insertion position to the cutting position (see FIG. 1b), with the optical fiber 105 to be cut being held essentially parallel to the rotation axis 106 of the pivoting movement throughout the entire pivoting movement, and the optical fiber 105 to be cut being touched by the anvil 102 exclusively in the cutting position. The optical fiber 105 to be cut is then scored at right angles to the longitudinal direction of the fiber 105, at a predetermined cutting point, by means of the cutting blade 107. Depending on the intensity of the scoring process and on any prestressing of the optical fiber 105 to be cut, caused, for example, by the anvil 102 having a curved surface, the fiber 105 is actually broken at this time or must be broken at a later time by deliberately bending the fiber 105.

After the fiber 105 has been scored, the element 103 which can pivot is pivoted from the cutting position (FIG. 1a) to a removal position which, on the basis of the exemplary embodiment of the invention as illustrated here, is identical to the insertion position. Once the element 103 which can pivot has been pivoted to the removal position, the fixing of the fiber 105, produced by the two clamping apparatuses (not illustrated), is released. Depending on the intensity of the scoring process and the intensity of the previously applied bending of the glass fiber 105 to be cut, an optical fiber 105 which has not yet been broken can now be removed from the groove 108, or two parts of the already broken fiber 105 can be removed from the groove 108.

Figure 2:
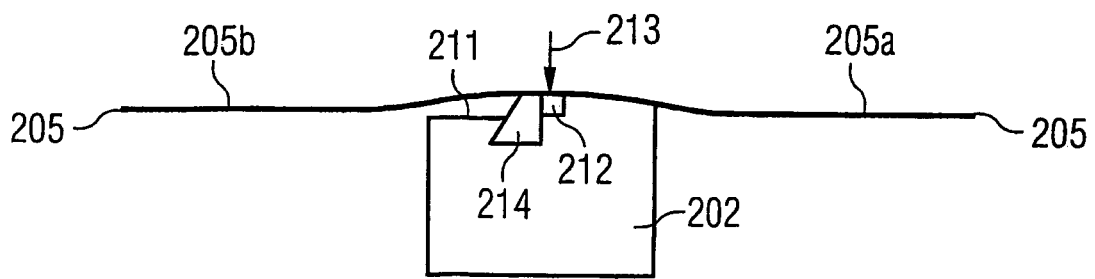
FIG. 2 shows a schematic cross-sectional view parallel to the axis of the fiber to be cut of the asymmetric shape of a contact element according to one development of an embodiment of the invention.

FIG. 2 shows a schematic cross-sectional view parallel to the optical fiber 205 to be cut, illustrating how the optical fiber 205 is passed over the anvil 202, when the element 103 which can pivot is in the cutting position. The anvil 202 has an asymmetrically shaped surface along the longitudinal direction of the fiber 205, with the asymmetry being produced by an incision 211 which, as is illustrated in FIG. 2, is located to the left of the cutting point 213. A plastic insert 214 is also provided to the left of the cutting point and is preferably produced from a soft material in order to minimize the mechanical damage caused by contact with the fiber core to be cut. This results in an increase in the tensile strength of a spliced fiber, in which two planar fiber ends are spliced to one another, with these planar fiber ends having been produced previously by means of the cutting apparatus 100, which has the plastic insert 214.

Immediately underneath the cutting point 213, the anvil 202 has a notch 212 which ensures that the side of the optical fiber 205 to be cut which is opposite the scoring blade 107 is not damaged by operation of the scoring blade 105. After being cut, the fiber 205 has two sections 205a, 205b, with only the section 205b still being used for further processing, for example for splicing to another optical fiber. The section 205a is generally no longer used for further processing of the fiber. For this reason, the following text refers to the section 205a as the waste section, and the section 205b as the good section. Before the cutting of the optical fiber 205, the fiber 205 to be cut is fixed by means of two clamping apparatuses, although this is not shown in FIG. 2b, with one clamping apparatus fixing the good section 205b of the fiber 205 to be cut, and a further clamping apparatus fixing the waste section 205a of the fiber.

The clamping apparatus which fixes the good section 205b is, according to the exemplary embodiments of the invention as described here, designed such that a sheath (not illustrated) of the optical fiber is fixed rather than the core of the optical fiber 205, with this sheath providing protection against damage for the good section 205b of the optical fiber 205 to be cut. The clamping apparatus which fixes the waste section 205a of the optical fiber 205 is designed, according to the exemplary embodiment described here, such that the core of the optical fiber 205 is fixed produced by an incision 211 which, as is illustrated in FIG. 2, is located to the left of the cutting point 213. A plastic insert 214 is also provided to the left of the cutting point and is preferably produced from a soft material in order to minimize the mechanical damage caused by contact with the fiber core to be cut. This results in an increase in the tensile strength of a spliced fiber, in which two planar fiber ends are spliced to one another, with these planar fiber ends having been produced previously by means of the cutting apparatus 100, which has the plastic insert 214.

Immediately underneath the cutting point 213, the anvil 202 has a notch 212 which ensures that the side of the optical fiber 205 to be cut which is opposite the scoring blade 107 is not damaged by operation of the scoring blade 105. After being cut, the fiber 205 has two sections 205a, 205b, with only the section 205b still being used for further processing, for example for splicing to another optical fiber. The section 205a is generally no longer used for further processing of the fiber. For this reason, the following text refers to the section 205a as the waste section, and the section 205b as the good section. Before the cutting of the optical fiber 205, the fiber 205 to be cut is fixed by means of two clamping apparatuses, although this is not shown in FIG. 2b, with one clamping apparatus fixing the good section 205b of the fiber 205 to be cut, and a further clamping apparatus fixing the waste section 205a of the fiber.

The clamping apparatus which fixes the good section 205b is, according to the exemplary embodiments of the invention as described here, designed such that a sheath (not illustrated) of the optical fiber is fixed rather than the core of the optical fiber 205, irrelevant for further use, in particular for the tensile strength of the fiber 205, since the good section 205b has a fiber sheath at the point at which the clamping apparatuses fix the good section 205b, according to the exemplary embodiment of the invention described here. The point on the good section 205b which touches the anvil 202 in the immediate vicinity of the cutting point 213 is likewise irrelevant, owing to the thermal healing, as already described above, of any fiber damage.

FIG. 3 shows an overall perspective illustration of a cutter 300 according to a first exemplary embodiment of the invention. The cutter 300 has a base plate 301. An anvil 302 is located in a cutout that is formed on the base plate 301. An element 303 which can pivot is mounted in a rotation shaft (not illustrated) on the base plate 301 such that the element 303 which can pivot can pivot between an insertion position, which is illustrated in FIG. 3, and a cutting position. The cutter 300 also has a scoring blade 307, which can be operated by the control lever 321.

A groove 308 is formed as a holding apparatus on the element 303 which can pivot, and has an interruption at least in the area of the anvil 302. The optical fiber to be cut (not illustrated) is inserted into the groove 308 in accordance with the exemplary embodiment of the invention described here, and is secured by way of a locking lever 324, which presses the optical fiber to be cut against the contact projection 323 such that the good section 205b of the optical fiber to be cut is held firmly on the element 303 which can pivot.

Once the element 303 which can pivot has been pivoted to the cutting position, the control lever 321 can be operated. The control lever 321, according to the exemplary embodiment of the invention described here, not only operates the scoring blade 307 but also presses the clamping jaws 320 against the optical fiber to be cut such that it is fixed, particularly in the area of the anvil 302.

According to the first exemplary embodiment of the invention, the left-hand clamping jaw 320 illustrated in FIG. 3 presses on the good section 205b of the fiber, which has a fiber sheath, except in a small area in the vicinity of the cutting point. The right-hand clamping jaw 320 illustrated in FIG. 3 presses on the waste section 205a of the optical fiber (not illustrated) to be cut, which does not have a fiber sheath. The cutter 300 also has a waste container 322, in which the waste sections 205a from a large number of cutting processes that have been carried out can be collected. This has the advantage that the waste sections 205a are reliably collected, thus reducing any risk of skin injuries caused by waste sections 205a flying around.

Figure 4A:
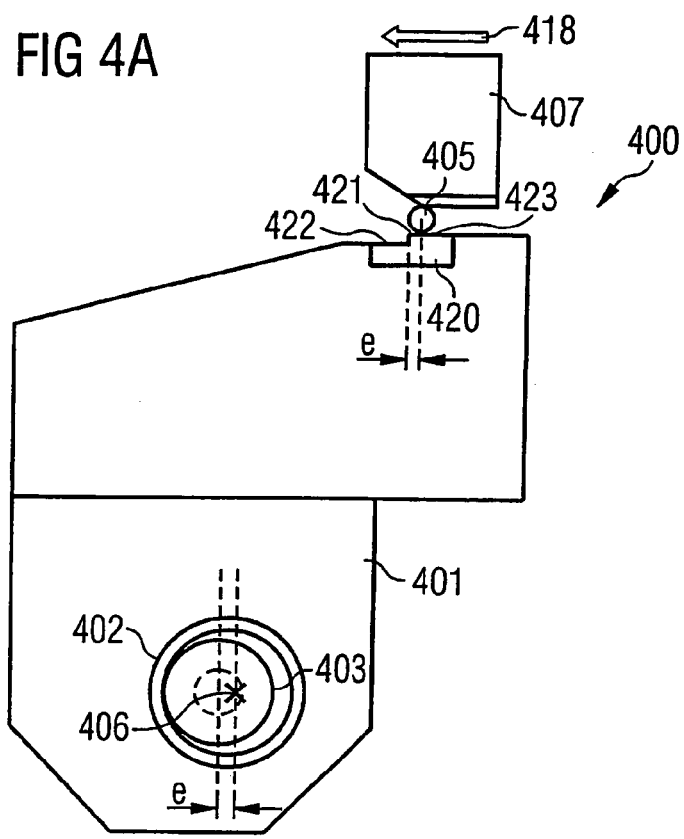
FIG. 4a shows a schematic cross-sectional view at right angles to the axis of the fiber to be cut of a cutting apparatus according to a second exemplary embodiment of the invention. The rotation shaft has been moved to the left by way of an eccentric shaft.
Figure 4B:
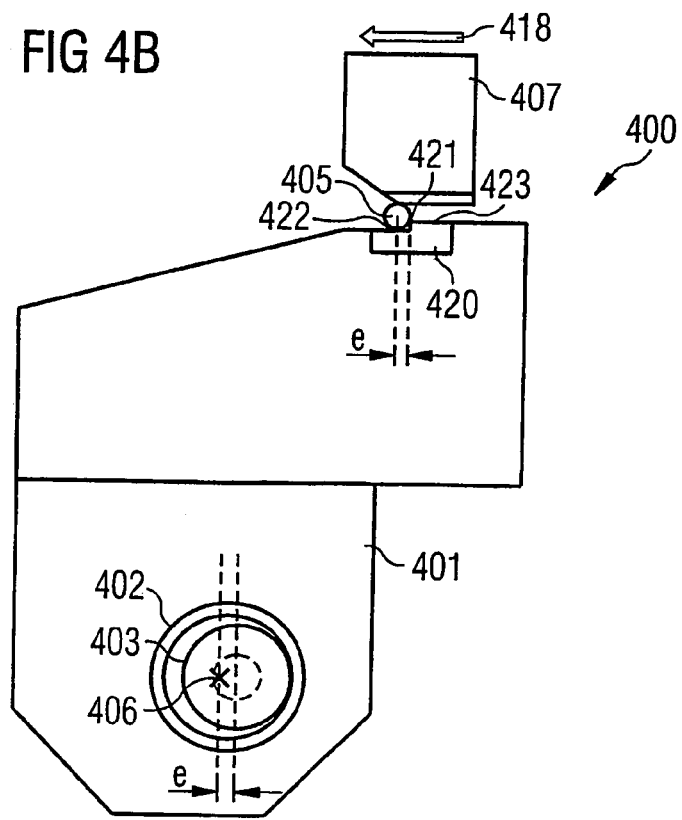
FIG. 4b shows the cutting apparatus as illustrated in FIG. 4a. The rotation shaft has been moved to the right by way of the eccentric shaft.

FIGS. 4a and 4b show a schematic cross-sectional view, at right angles to the axis of the optical fiber to be cut, of a cutting apparatus 400 according to a second exemplary embodiment of the invention. Where the same reference symbols are used in the following text and in FIGS. 4a and 4b, then these always relate to the same components of the cutting apparatus 400. The cutting apparatus 400 has an element 401 which can pivot and is fitted to a base plate, which is not illustrated, and can pivot about an eccentric shaft 402. The optical fiber 405 to be cut is pivoted from the insertion position to a cutting position by way of the element 401 which can pivot.

Depending on the position of the eccentric shaft 402, the rotation shaft 403 of the element which can pivot is moved through a distance e to the left (FIG. 4a) or through a distance e to the right (FIG. 4b) relative to a null position 406 of the rotation shaft 403. When the rotation shaft 403 is moved to the left, this is also associated with a very small movement of the rotation shaft 403 upward, although this is not illustrated in FIG. 4a. Furthermore, the movement of the rotation shaft 403 to the right is associated with a very small movement of the rotation shaft 403 downward, although this is not illustrated in FIG. 4b. As is illustrated in FIGS. 4a and 4b, the contact point of the fiber to be cut on the contact element 420 also changes when the rotation shaft 403 is moved, with the contact element 420 having a first contact surface 422 and a second contact surface 423. The two contact surfaces are separated from one another by means of a step which has an edge 421, so that the second contact surface 433 is located at a lower level than the first contact surface 422.

As can be seen from FIG. 4a, the contact point of the fiber 405 to be cut is at a distance e' to the right of the edge 421 when the rotation shaft 403 is moved to the left. As can be seen from FIG. 4b, the contact point of the fiber 405 to be cut is at a distance e' to the left of the edge 421 when the rotation shaft 403 is moved to the right.

The scoring device has a scoring blade 407 with a sharp lower edge which is moved along the movement direction indicated by the arrow 418 on the surface of the fiber 405 in order to score the fiber 405 to be cut. The eccentric shaft 402 can be positioned suitably in order to ensure that the contact point of the fiber to be cut is at a distance from the scoring plane which is matched to the respective diameter of the fiber to be cut. The center axes of fibers to be cut which have different thicknesses preferably lie on a plane which runs parallel to the scoring plane. The cutting apparatus 400 can thus be switched by simple movement of the rotation shaft 403 to make it possible to cut optical fibers with different fiber diameters without any further adjustment of the cutting apparatus 400.

It should be mentioned that the invention is in no way restricted to a cutting apparatus 400 which is suitable for only two different fiber diameters. For example, by using two or more eccentric shafts or by using any desired number of other apparatuses for movement of the rotation shaft of the element which can pivot in conjunction with a contact element having two or more steps or having an obliquely running surface, it is possible to produce a cutting apparatus which is suitable for a large number of different fiber diameters.

Figure 5:
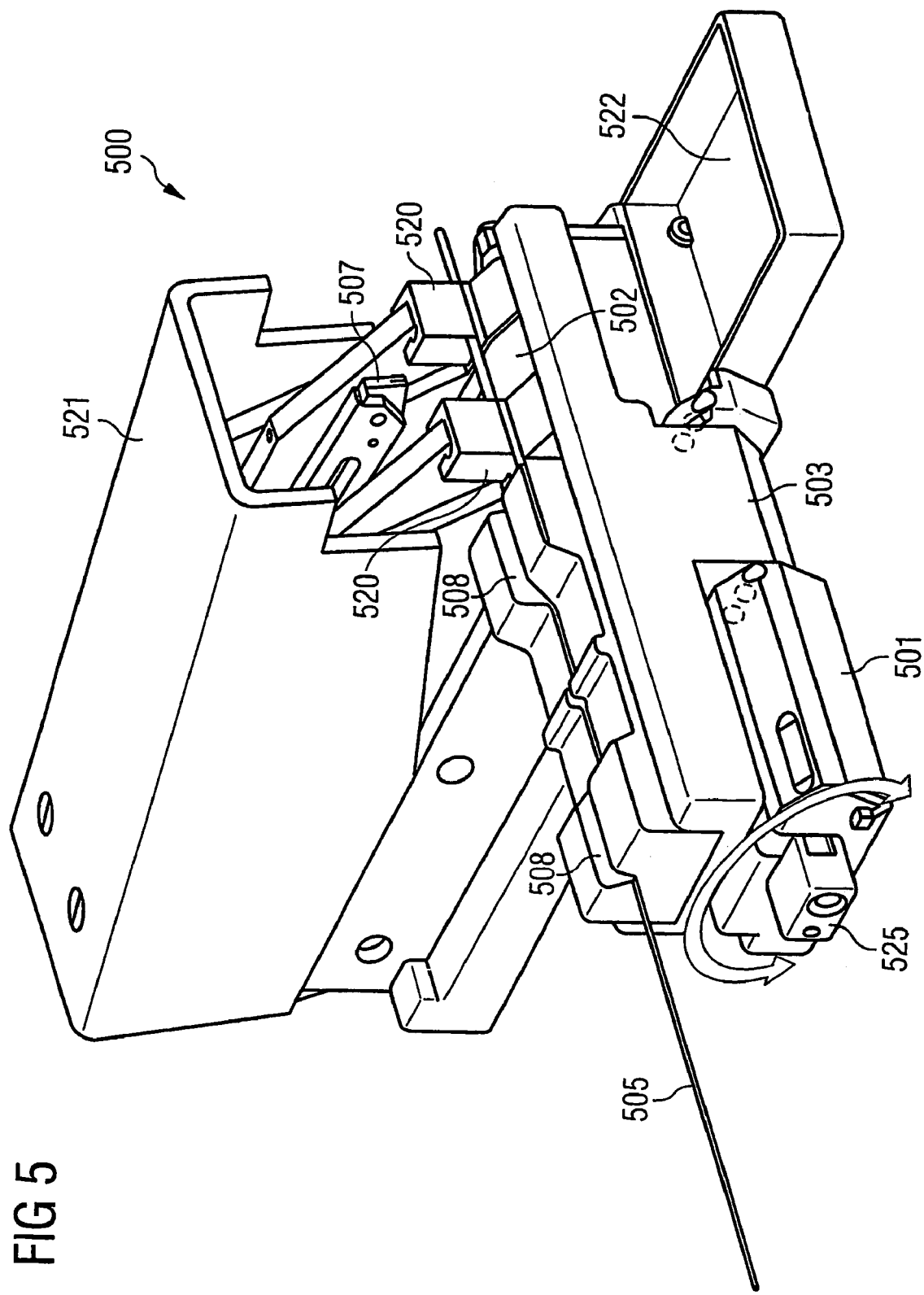
FIG. 5 shows a perspective overall view of the cutting apparatus according to the second exemplary embodiment of the invention.

FIG. 5 shows an overall perspective illustration of a cutter 500 according to a second exemplary embodiment of the invention. The cutter 500 has a base plate 501 on which an eccentric shaft (not illustrated) and an eccentric lever 525 are arranged. The eccentric shaft can be moved eccentrically by way of the eccentric lever 525 such that, as explained above, the cutting apparatus can be matched to different fiber diameters. The cutting point on the optical fiber 505 to be cut rests on a two-step anvil 502 when the element which can pivot is located, as illustrated in FIG. 5, in the cutting position.

The cutter 500 furthermore has a scoring blade 507 which can be operated by the control lever 521. A groove 508, in which the optical fiber 505 to be cut is inserted, is formed as a holding apparatus on the element 503 which can pivot. The fiber 505 to be cut is fixed by way of two clamping jaws 520 on the anvil 502 before the actual cutting process, such that the position of the fiber 505 is not changed while the fiber is being scored by the scoring blade 507.

Like the cutter 300 which has been described with reference to FIG. 3, the cutter 500 has a waste container 522 in which the cut-off fiber pieces can be collected.

In summary, the various embodiments of the invention provide an apparatus and a method for cutting at least one optical fiber, with the use of an element 103 which can pivot and an anvil 202 which is shaped asymmetrically resulting in the good section 205b of the fiber 205 to be cut being touched at only two points which are essentially not significant to the tensile strength of a spliced fiber which includes the good section 205b. At one of these points, the glass fiber core of the good section 205b of the fiber 205 is protected against damage by a fiber sheath. At the other point, which is located in the immediate vicinity of the cutting point, any mechanical damage is of only secondary importance, since this point is heated during the splicing of the good section 205, such that any mechanical damage to the glass fiber core is at least partially healed by heating of the fiber end of the good section 205b.

Furthermore, according to one exemplary embodiment of the invention, the damage at the other point is considerably reduced by the use of a plastic insert, thus considerably increasing the resultant tensile strength of a spliced fiber. According to a second exemplary embodiment of the invention, the rotation shaft 403 of the element 401 which can pivot is moved such that the fiber 405 touches the contact element 420 at a contact point 422, 423, which is associated with the respective position of the rotation shaft 403, after the pivoting of the element 401 which can pivot to the cutting position, with the vertical distance between the scoring plane and the respective contact point 422, 423 depending on the position of the rotation shaft 403. The cutting apparatus 400 can thus be used for fibers of different thickness.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An apparatus for cutting at least one optical fiber, comprising:
   a contact element;
   an element adapted to pivot mounted on a rotation shaft, the element adapted to pivot being pivotable relative to the contact element between an insertion position and a cutting position;
   at least one holding apparatus, the at least one holding apparatus being at least one of fitted to and formed on the element adapted to pivot, wherein
   the at least one holding apparatus is configured to hold at least one fiber in a defined position relative to the element adapted to pivot over an entire profile of a pivoting movement between the insertion position and the cutting position and is configured to hold at least a portion of the at least one fiber aligned essentially parallel to the rotation shaft; and
   a scoring device fitted to the contact element, configured to move linearly and at right angles to the rotation shaft in a scoring plane running parallel to the rotation shaft, and configured to score the at least one fiber held by the holding apparatus of the element adapted to pivot, wherein
   the holding apparatus holds the fiber on both sides of the scoring device, wherein
   the at least one fiber held by the holding apparatus is touched by the contact element exclusively in the cutting position,
   the at least one holding apparatus is at a distance from the other components of the apparatus and is configured to be freely accessible from one side for convenient and protective insertion of the at least one fiber if the element adapted to pivot is in the insertion position,
   the element adapted to pivot is pivotable relative to the scoring device between the insertion position and the cutting position, and
   the contact element is stationary.

2. The apparatus as claimed in claim 1, wherein the at least one holding apparatus is a groove formed in the element adapted to pivot.

3. The apparatus as claimed in claim 1, further comprising:
a first clamping apparatus and a second clamping apparatus fitted to at least one of the contact element and the element adapted to pivot, wherein
the first clamping apparatus is configured to fix each fiber held by the at least one holding apparatus on a first side, and
the second clamping apparatus is configured to fix each fiber held by the at least one holding apparatus on a second side.

4. The apparatus as claimed in claim 3, wherein
the at least one holding apparatus and the two clamping apparatuses are configured to fix the at least one fiber, the at least one fiber including a partially removed sheath,
the first clamping apparatus is configured to fix a first section of the at least one fiber including the sheath, and
the second clamping apparatus is configured to fix a second section of the at least one fiber not including the sheath.

5. The apparatus as claimed in claim 1, wherein the contact element includes a curved surface along the longitudinal direction of the fiber so that a fiber that needs to be cut is prestressed with a defined curvature if the element adapted to pivot is in the cutting position.

6. The apparatus as claimed in claim 4, wherein
the contact element is designed asymmetrically along the longitudinal direction of the at least one fiber,
the contact element is configured to touch a subsection of the at least one fiber to be cut, the subsection of the fiber to be cut including no sheath and located on the second side, and
the at least one fiber is held at only the first section and the second section if the element adapted to pivot is in the cutting position.

7. The apparatus as claimed in claim 6, wherein the contact element includes a plastic insert and is configured to touch the subsection of the fiber to be cut exclusively with the plastic insert.

8. The apparatus as claimed in claim 1, wherein the contact element includes an anvil and a base element.

9. The apparatus as claimed in claim 1, wherein the contact element includes contact points at different distances from the scoring plane, and wherein the rotation shaft of the element adapted to pivot is movable such that the fiber to be cut rests on a contact point associated with the respective position, as a function of the respective position of the rotation shaft, when the element adapted to pivot is in the cutting position.

10. The apparatus as claimed in claim 9, wherein, when the rotation shaft is moved, the vertical distance between the scoring plane and an axis which coincides at least in the center of the interruption with the center axis of an inserted fiber remains unchanged when the element adapted to pivot is in the cutting position.

11. The apparatus as claimed in claim 9, wherein the rotation shaft is movable by at least one eccentric shaft.

12. The apparatus as claimed in claim 9, wherein the rotation shaft is movable between at least two discrete positions.

13. The apparatus as claimed in claim 12, wherein the contact element includes a stepped surface with at least one edge which runs parallel to the longitudinal direction of the fiber, and with at least two contact surfaces which are parallel to the scoring plane.

14. A method for cutting at least one optical fiber, comprising:
pivoting an element adapted to pivot to an insertion position;
holding at least one fiber in a defined position relative to the element adapted to pivot over an entire profile of a pivoting movement between the insertion position and a cutting position;
pivoting the element from the insertion position to the cutting position, the fiber being held essentially parallel to the rotation axis of the pivoting movement throughout the entire pivoting movement, and the fiber being touched by a contact element exclusively in the cutting position;
scoring the fiber at a predetermined cutting point using a linear scoring movement at right angles to the longitudinal direction of the fiber and in a scoring plane which runs parallel to the longitudinal direction of the fiber, while the fiber is still held by the element adapted to pivot,
pivoting the element from the cutting position to a removal position; and
removing the fiber, wherein
the element adapted to pivot is pivotable relative to the scoring plane between the insertion position and the cutting position, and
the contact element is stationary.

15. The method as claimed in claim 14, wherein the insertion position and the removal position are identical.

16. The method as claimed in claim 14, further comprising:
fixing the at least one fiber using a first clamping apparatus and a second clamping apparatus on the element; and
releasing the second clamping apparatus after the element has pivoted from the cutting position to the removal position, wherein
the fixing of the at least one fiber with the first clamping apparatus fixes the at least one fiber on a first side of the predetermined cutting point, and the fixing of the at least one fiber with the second clamping apparatus fixes the at least one fiber on a second side of the predetermined cutting point.

17. The method as claimed in claim 14, wherein scoring the fiber step cuts the fiber into two parts.

18. The method as claimed in claim 14, wherein the fiber is prestressed with a defined curvature by the shape of the contact element when the element is in the cutting position.

19. The method as claimed in claim 14, wherein the fiber is held essentially without any contact in the vicinity of the cutting point on one side of the cutting point using the contact element having a shape which is asymmetric relative to the cutting point.

20. The method as claimed in claim 14, wherein, before the element is pivoted from the insertion position to the cutting position, the rotation shaft is moved such that the fiber to be cut touches the contact element at a contact point associated with the respective position of the rotation shaft, after the element which can pivot has been pivoted to the cutting position.

21. The method as claimed in claim 20, wherein the rotation shaft is moved to a predetermined position as a function of the diameter of the fiber to be cut.

22. The apparatus as claimed in claim 2, further comprising:
a first clamping apparatus and a second clamping apparatus fitted to at least one of the contact element and the element adapted to pivot, wherein
the first clamping apparatus is configured fix each fiber held by the at least one holding apparatus on a first side, and
the second clamping apparatus is configured to fix each fiber held by the at least one holding apparatus on a second side.

23. The apparatus as claimed in claim 22, wherein
the holding apparatus and the two clamping apparatuses are configured to fix the at least one fiber, the at least one fiber including a partially removed sheath,
the first clamping apparatus is configured to fix a first section of the at least one fiber including the sheath, and
the second clamping apparatus is configured to fix a second section of the at least one fiber not including the sheath.

24. The apparatus as claimed in claim 2, wherein the contact element includes a curved surface along the longitudinal direction of the fiber so that a fiber that needs to be cut is prestressed with a defined curvature if the element adapted to pivot is in the cutting position.

25. The apparatus as claimed in claim 5, wherein the contact element is designed asymmetrically relative to the interruption and along the longitudinal direction of the fiber such that a subsection of the fiber to be cut, which includes no sheath and is located on the first side of the interruption, is held essentially without any contact while the element adapted to pivot is in the cutting position, and touches the contact element only in the at least immediate vicinity of the interruption.

26. The apparatus as claimed in claim 25, wherein the contact element includes a plastic insert arranged such that a subsection of the fiber to be cut, including no sheath, is touched exclusively by the plastic insert.

27. The apparatus as claimed in claim 2, wherein the contact element includes contact points at different distances from the scoring plane, and wherein the rotation shaft of the element adapted to pivot is movable such that the fiber to be cut rests on a contact point associated with the respective position, as a function of the respective position of the rotation shaft, when the element adapted to pivot is in the cutting position.

28. The apparatus as claimed in claim 27, wherein, when the rotation shaft is moved, the vertical distance between the scoring plane and an axis which coincides at least in the center of the interruption with the center axis of an inserted fiber remains unchanged when the element adapted to pivot is in the cutting position.

29. The apparatus as claimed in claim 10, wherein the rotation shaft is movable by at least one eccentric shaft.

30. The apparatus as claimed in claim 10, wherein the rotation shaft is movable between at least two discrete positions.

31. The apparatus as claimed in claim 11, wherein the rotation shaft is movable between at least two discrete positions.

32. An apparatus for cutting at least one optical fiber, comprising:
means for pivoting an element adapted to pivot to an insertion position;
means for holding at least one fiber in a defined position relative to the element adapted to pivot over an entire profile of a pivoting movement between an insertion position and a cutting position, wherein the at least one fiber is held essentially parallel to the rotation axis of the pivoting movement throughout the entire pivoting movement, the at least one fiber being touched by a contact element exclusively in the cutting position;
means for scoring the at least one fiber at a predetermined cutting point fitted to the contact element, the means for scoring the at least one fiber using a linear scoring movement at right angles to the longitudinal direction of the fiber and in a scoring plane which runs parallel to the longitudinal direction of the fiber, wherein
the means for pivoting an element adapted to pivot pivots the element adapted to pivot relative to the contact element and the means for scoring the at least one fiber between the insertion position and the cutting position, and
the means for holding holds the fiber on both sides of the means for scoring during operation of the means for scoring and
the contact element is stationary.

* * * * *